Nov. 24, 1953
D. ADAMS
2,660,530
EGGS HAVING ARTIFICIAL SHELLS
Filed June 16, 1949
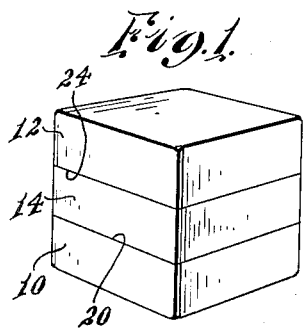
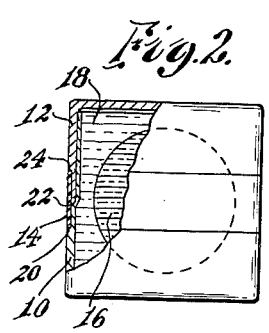
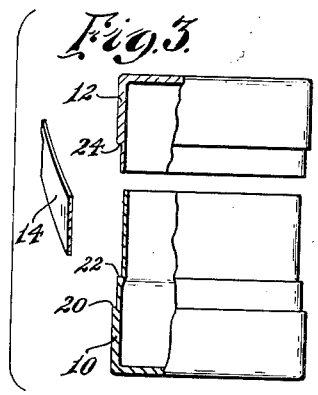
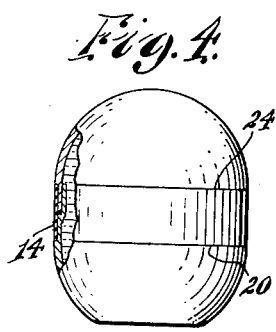
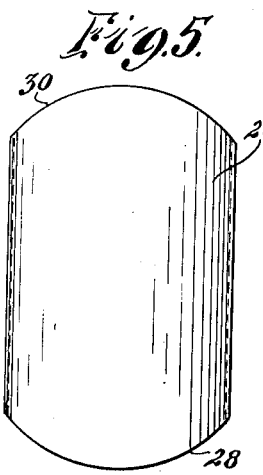
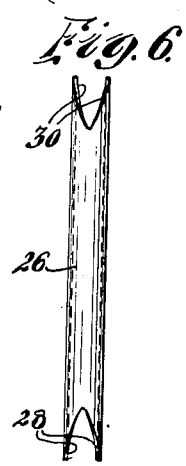
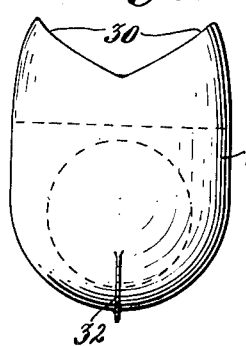
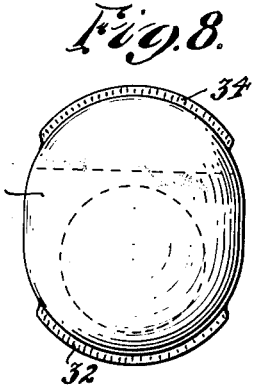
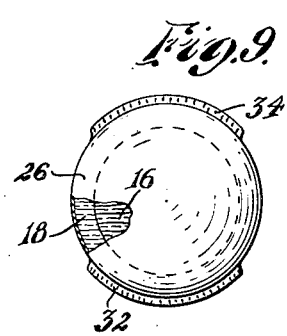
INVENTOR.
David Adams
BY his atty.
John H. McKenna Patented Nov. 24, 1953

2,660,530

UNITED STATES PATENT OFFICE 2,660,530

EGGS HAVING ARTIFICIAL SHELLS

David Adams, Concord, Mass.

Application June 16, 1949, Serial No. 99,398

4 Claims. (Cl. 99—177)

This invention relates to improvements in eggs. More particularly it provides individual eggs whose edible substance is enclosed within a tough and strong shell or skin which maintains the individuality of each egg but which is highly resistant to fracture or rupture under the stresses and shocks to which eggs may be subjected, and which enables the individual eggs to have or to assume shapes conducive to conservation of space when packaging, storing or shipping eggs in quantity.

This application is a continuation in part of my application Serial No. 745,890, filed May 3, 1947, entitled Eggs Having Artificial Shells, now abandoned.

It is well known that very substantial losses ensue each year due to breakage of egg shells in the course of handling and shipping of eggs. Various relatively expensive devices and special containers have been provided to minimize breakage losses but, notwithstanding all reasonable precautions, substantial breakage losses continue. Furthermore, eggs are graded according to size or weight, shape, color of shell and the condition of the shell. For example, local prejudices have grown up which make it expedient to class brown shell eggs as first grade eggs for one locality and as lower grade eggs for another locality where only white shell eggs may be considered first grade eggs. Also, the fact that an egg may be abnormally round, or long, or have a speckled shell, may be cause for relegating it to something less than first grade notwithstanding that the contents of its shell may be in all respects perfect. Furthermore, if an egg, in candling, is found to contain so-called meat spots or blood spots, it must be graded something less than a first grade egg. Hence, in addition to breakage losses, very sizable losses each year may be traced to the need for putting eggs having particular shell characteristics or imperfect egg content of the shells in a grade below first grade, for sale at prices below the price demanded for first grade eggs.

It is among the objects of the invention to provide an egg whose natural shell is replaced by a tough and strong artificial shell or skin. In particular embodiments of the invention, resilient artificial shells may be pre-formed to give the eggs any of a variety of shapes, such as oval or round or rectangular. Another embodiment employs a flexible skin-type of artificial shell which closely and pliably confines the edible substance of an egg to provide generally spherical eggs which yield under relatively small pressures whereby a quantity of individual eggs may fill substantially all available space in a shipping container or the like without losing their individuality.

A feature is that, in particular embodiments of the invention, each substituted shell may be exactly like each other, and each egg having an artificial shell may be classed as a first grade egg regardless of any peculiarity that may have been present in its natural shell.

Another object of the invention is to provide an egg whose natural shell is replaced by a two-part preformed artificial shell whose line of juncture of parts is closed against escape of the edible substance within the shell.

Yet another object is to provide an egg whose natural shell is replaced by a tough and strong flexible skin of material which is made to closely confine the edible substance of the egg by substantial shrinking of the skin after the edible substance has been sealed within the skin.

Still another object is to provide an egg whose natural shell is replaced by an artificial soft shell which is a tough and strong flexible skin of material which closely confines the edible substance of the egg but which can stretch in response to interior pressures whereby the egg may be frozen without rupture of its artificial shell.

A further object is to provide an egg whose natural shell is replaced by a tough and strong and sealed artificial shell and whose edible substance is treated to kill all bacteria therein either before or after sealing of the edible substance within the artificial shell, whereby the artificial shell can preserve the edible substance of the egg in the absence of refrigeration.

A still further object is to provide an egg whose natural shell is replaced by a tough and strong and sealed artificial shell, both the shell material and the sealing means being of a nature to withstand boiling temperatures.

It is, moreover, my general purpose and object to provide individual eggs having articial shells which are highly resistant to fracture or rupture and which are conducive to safe space-conserving packaging of eggs in quantities for storage and shipment.

In the accompanying drawings:

Fig. 1 is a perspective view of a rectangular egg embodying features of my invention;

Fig. 2 is a side elevation of the egg of Fig. 1 with a portion of its shell broken away;

Fig. 3 is a side elevation of the artificial shell of the egg of Figs. 1 and 2, with its parts in separated relation and with a portion of the wall of each part broken away, a fragment of a sealing means for the parts being also shown;

Fig. 4 is a side elevation of a generally oval-shaped egg embodying features of the invention, a portion of the shell walls being broken away;

Fig. 5 is a side elevation of a tube of flexible and pliable material suitable for constituting a skin-type of artificial shell for an egg;

Fig. 6 is an edge elevation of the tube of Fig. 5;

Fig. 7 shows the tube as represented in Fig. 6 after its lower end has been sealed, and with the edible substance of an egg deposited therein through its open upper end;

Fig. 8 shows the egg-containing tube of Fig. 7 after its upper end has been sealed but with the tube turned through ninety degrees from its position of Fig. 7; and Fig. 9 shows the egg-containing completely sealed tube of Fig. 8 after the tube has been shrunk to closely confine the egg substance.

Referring to the drawing, the embodiment of the invention as shown in Figs. 1-3 employs an artificial shell which is generally in the shape of a cube although the shell may be variously pre-shaped as desired. The artificial shell of Figs. 1-3 comprises a body section 10 and a cover section 12, with an adhesive tape 14 for securing the sections together. In Fig. 2, the yolk of an egg is indicated at 16 and the albumen at 18, and it will be apparent that the yolk will be surrounded by albumen generally the same as within the natural shell.

Sections 10, 12 may be made of any suitably strong and tough material which will have no deleterious effect on the edible substance of the egg and which will be highly resistant to fracture under the stresses and shocks to which eggs may be subjected in the course of handling and shipping of eggs in trade and commerce. For example, the sections may be stamped or otherwise formed of sheet metal such as aluminium or tin, or they may be molded or otherwise formed of available thermo-plastic materials which, preferably, will be selected from thermo-plastic materials which are capable of withstanding boiling temperatures. Hence, commercially available heat resistant polystyrenes are recommended as suitable thermo-plastic materials from which the shell sections 10, 12 may be made. One such polystyrene is available commercially under the trade name "Kopper's P8," and another is available commercially under the trade name "Styron." Both will withstand boiling temperatures and have no deleterious effect upon the edible substance of an egg in contact therewith. A heat resistant methyl methacrylate resin thermo-plastic, available as heat resistant "Lucite," also will be found suitable as a material from which to make the shell sections 10, 12. The mentioned thermo-plastic materials may be opaque, translucent or transparent, according to preference.

It is contemplated that the walls of the shell sections 10, 12 will be fairly rigid although some flexibility is not objectionable so long as the walls resiliently return to approximately their predetermined shape when a distorting force is removed.

The edible substance of an egg may be transferred from its natural shell to the section 10 in any convenient or desired manner, and the section 10 preferably will have capacity for holding the edible substance of only one average size egg with the deposited egg filling section 10 to just slightly below its top edge. If a particular egg is smaller than average, a little albumen from another egg may be added to bring the egg substance to a proper level in the section 10. On the other hand, if a particular egg is larger than average, some of its albumen will be left over when section 10 is properly filled, and will be available for addition to a smaller than average egg. Also, when an egg is being transferred from its natural shell to the artificial shell section 10, any observed blood spots or meat spots may be removed.

After the edible substance of an egg has been deposited in a body section 10, a cover section 12 is applied thereto for completely enclosing the egg substance with a minimum of interior space left unoccupied by the egg substance. This minimizes the possibility of the yolk becoming broken during subsequent handling of the egg. The shell sections next are secured together as by the adhesive tape 14 which is passed around the egg at the line of exterior juncture of the sections 10, 12.

It is a feature of the invention that my improved eggs greatly simplify the procedure of handling and shipping eggs because they need no special care against breakage of shells. Another important feature, however, is that every egg having an artificial shell of one of the types represented in Figs. 1-4, may be made uniform in size, weight and exterior characteristics, and pecularities of the natural shells become unimportant.

Considering the embodiments of Figs. 1-4, it is desirable, as a matter of convenience, to have one artificial shell section capable of holding the egg substance of an entire egg, but this is not necessary, and each section may hold only a portion of the egg. However, when the body section 10 holds the entire egg substance, the cover section 12 conveniently may be used to hold the yolk or the albumen when it may be desirable to separate the yolk from the white, or albumen, in the process of preparing a cake mix, for example. Also, the body section 10 conveniently may serve as an egg cup from which a boiled egg may be directly eaten after the cover section 12 has been removed.

Whether my improved eggs are shaped as cubes, as in Figs. 1-3, have the generally oval shape of Fig. 4, or are of some other shape, I prefer to form the sections so that, when they are assembled, the sealing tape 14 is below or flush with the adjacent surfaces of the shell sections. As best seen in Figs. 2 and 3, the body section 10 has the upper portion of its side walls slightly reduced in thickness to provide an exterior shoulder at 20 extending all around the section. Also, at a location about half the width of sealing tape 14 above the shoulder 20, the reduced walls are slightly in-set to provide a second shoulder 22. The cover section 12 has its walls slightly reduced in thickness to provide an exterior shoulder 24 which is located about half the width of the sealing tape from the lip or edge of the section. When the sections are assembled, the in-set portion of section 10 fits within section 12 so that the edge of section 12 seats on shoulder 22 of section 10. This provides an annular shallow groove around the shell between the shoulders 20, 24 within which the sealing tape 14 seats so as to be substantially flush with the adjacent exterior wall surfaces of the sections and thus protected against accidental loosening of the tape during handling and shipping of eggs. However, the tape may be readily removed when it is desired to open an egg, by engaging a blade or a fingernail under the edge of the tape at one of the shoulders 20, 24, to loosen the tape for being stripped from the sections.

The adhesive tape 14 may be any of the available moisture-proof adhesive tapes suitable for effectively securing the shell sections together and for preventing leakage of egg substance at the taped juncture of the sections. However, it is preferred to have my improved eggs capable of being boiled, and the tape 14 preferably will be of a nature to retain its sealing properties under boiling temperatures. Hence, one of the so-called aluminium tapes is recommended as a satisfactory sealing tape 14 which will withstand boiling temperatures. Such tapes have aluminium foil coated with a heat-resistant moisture-proof adhesive. Also, the well known "Scotch" tapes will be found suitable and are available in opaque, translucent and transparent varieties. They have a film of vinyl resin coated with a crude rubber adhesive.

It will be obvious from the foregoing description of the embodiment of the invention illustrated in Figs. 1–3, that the artificial shell of this egg is highly resistant to fracture and can successfully withstand the stresses and shocks to which eggs may be subjected in commercial handling and shipping procedures. Also, the rectangular shape of each egg greatly facilitates packing and packaging of eggs in quantity, with maximum utilization of all available space. Yet each egg retains its individuality and may be used the same as an ordinary egg. When its sealing tape 14 is removed, the cover section 12 may be lifted off and the egg substance in section 10 may be deposited wherever desired, such as into a mixing bowl or into a frying pan. If a boiled egg is wanted, one of my improved eggs, in sealed condition, will be deposited in boiling water and left for the required time.

The embodiment of the invention shown in Fig. 4 is generally the same as the Figs. 1–3 embodiment, excepting its shape.

Figs. 5–9 illustrate an embodiment of the invention wherein the artificial shell is of flexible sheet material which is pliable but tough and strong enough to resist rupture under the pressures and shocks to which eggs may be subjected in handling and transportation. This produces soft-shell eggs as distinguished from the earlier described hard-shell eggs, yet the shells in each instance are tough and strong against crushing stresses.

Referring to Figs. 5 and 6, my so-called soft-shell preferably will be a relatively short length of flexible and pliable sheet material in tubular form. An extruded thermo-plastic film which is available under the commercial name of "Cry-O-Rap" is recommended as a highly satisfactory and desirable material for the tubes. This material is a specially developed vinylidene-type copolymer compounded to be odorless and tasteless, and it is extremely tough. It has a high coefficient of shrinkage when subjected to relatively high temperatures, such as when momentarily immersed in hot water of temperatures ranging between 185° and 195° F., for example. The film may be extruded in tubular form, and the open ends of a tube, such as the tube of Figs. 5 and 6, may be heat-sealed electronically to provide hermetic seals at each end of the tube.

According to the invention, the open end walls of the tube 26 of Figs. 5 and 6 have arcuate convex contour, as at 28, 30 in Fig. 5. One end of the tube, such as end 28, is first heat-sealed electronically, or otherwise, as indicated at 32 in Figs. 7 and 8. The edible substance of an egg is next deposited from its natural shell into the artificial shell through the open upper end, as in Fig. 7, wherein it will be observed that the egg substance only partially fills the artificial shell. This leaves ample wall portions projecting above the egg substance facilitating heat-sealing of the upper end, the same as the lower end, as indicated at 34 in Fig. 8.

However, before the upper end is closed and sealed, the shell is vacuumized so that, when the upper end is sealed, substantially all air will have been removed from the interior of the hermetically sealed artificial shell, but a substantial unoccupied space is left within the shell. Hence, the hermetically sealed egg of Fig. 8 is next subjected to shell-shrinking temperature, such as by immersing it momentarily in hot water of temperatures ranging between 185°–195° F., for example. This shrinks the artificial shell into tight skin-like enclosing relation to the egg substance with the yolk 16 substantially concentric within the surrounding albumen 18, as illustrated in Fig. 9, which shows a completed soft-shell egg whose shell is strongly resistant to crushing stresses. However, this egg with "Cry-O-Rap" shell is readily openable by puncturing the shell, after which the shell wall material tears relatively freely.

Electronic heat-sealing of the ends of the tube of Figs. 5–8 is considered a preferable way of closing and sealing the tube. However, the ends of the tube may, if desired, be thermally sealed or may be sealed by a heat-resistant adhesive. In some cases, it may be preferable to electronically heat-seal one end, such as end 28, and to otherwise seal the end 30.

A feature of importance resides in the fact that my improved soft-shell egg as disclosed in Fig. 9 may be subjected to any of the commercial processes for freezing food without rupture of its shell. Notwithstanding that the shell is shrunk in tight enclosing relation to the edible substance of the egg, it can stretch and expand in response to interior pressures due to expansion of the edible substance of the egg. A natural egg shell becomes ruptured if attempt is made to freeze the egg.

The term artificial shell as used herein, and more especially, in the appended claims, is intended to include both the hard-shell embodiments of the invention as shown in Figs. 1–4, and the soft-shell embodiment of Figs. 5–9.

Regarding the preservation of the freshness of the edible egg substance in the artificial shells provided in accordance with my present invention, the recently demonstrated beneficial effects of cathode ray and Roentgen ray electronic treatments of living and dead tissue to kill harmful bacteria, promises to enable the preservation of food products over long periods without any need for cooking or refrigeration. My improved eggs with their substituted artificial shells are particularly well adapted for such electronic treatments.

While a hermetic or other airtight sealing of my artificial egg shells will be necessary if and when the egg content thereof is treated by irradiation to preserve the edible egg substance against deterioration, actual airtight sealing of the shells is not requisite where the eggs are to be preserved by freezing, or where they are to be consumed or used within relatively short periods of time after being transferred in a fresh condition from their natural shells to my artificial shells. Actually, my eggs with artificial shells, sealed against escape of egg substance but not sealed airtight, will remain edible for substantially the same length of time as a natural egg, under the same conditions. Obviously, in the case of a soft-shell egg from which air has been evacuated, the maintenance of the vacuum requires an air-tight seal.

I claim as my invention:

1. An individual egg having an artificial shell of flexible sheet material enclosing its yolk and albumen and shrunk into generally spherical closely confining relation to the yolk and albumen with the yolk intact and substantially uniformly surrounded by albumen.

2. An individual egg having an artificial shell substituted for its natural shell, said artificial shell being of tough and strong flexible sheet material having a high coefficient of shrinkage at predetermined temperatures and being in sealed enclosing relation to the yolk and albumen of the egg and shrunk, at said predetermined temperatures, into closely confining enclosing relation to said yolk and albumen with the albumen substantially uniformly surrounding and protecting the yolk.

3. An individual egg having its yolk and albumen enclosed within an artificial shell substituted for the fragile natural shell, said egg with artificial shell retaining its individuality when associated with other eggs for shipment and storage, and said artificial shell being more resistant than the natural shell to rupture under the stresses and shocks to which eggs are likely to be subjected in handling and shipping them in quantities, every portion of said artificial shell being constantly maintained in substantially spaced relation to said yolk by a substantial intervening body of said albumen, and said albumen being relatively closely confined by the artificial shell and maintained thereby against any appreciable displacement within the artificial shell in response to pressure applied to opposite wall portions of the artificial shell, whereby the albumen maintains the yolk intact when the egg with artificial shell is subjected to stresses and shocks of a nature to rupture a natural egg shell.

4. An individual egg having its yolk and albumen enclosed within an artificial shell substituted for the fragile natural shell, said egg with artificial shell retaining its individuality when associated with other eggs for shipment and storage, and said artificial shell being more resistant than the natural shell to rupture under the stresses and shocks to which eggs are likely to be subjected in handling and shipping them in quantities, said artificial shell comprising two shell sections fitted together, and adhesive tape extending exteriorly around the juncture of said fitted together sections securing the sections together in relatively closely confining relation to said albumen with said yolk intact within the albumen and maintained by the albumen substantially spaced from all portions of the shell sections, said shell sections and said securing adhesive tape being of a nature to withstand boiling temperatures, whereby the egg with artificial shell may be boiled in like manner as an egg with a natural shell.

DAVID ADAMS.

References Cited in the file of this patent

UNITED STATES PATENTS

| Number | Name | Date |
|---|---|---|
| 154,553 | Kuh | Sept. 1, 1874 |
| 969,954 | Holmes | Sept. 13, 1910 |
| 2,340,260 | Clunan | Jan. 25, 1944 |
| 2,354,590 | Gilfillan et al. | July 25, 1944 |
| 2,369,765 | Waters | Feb. 20, 1945 |
| 2,452,174 | Arnold | Oct. 26, 1948 |
| 2,496,755 | Schwartzberg | Feb. 7, 1950 |
| 2,525,096 | Damuth | Oct. 10, 1950 |

FOREIGN PATENTS

| Number | Country | Date |
|---|---|---|
| 326,549 | Great Britain | Mar. 17, 1930 |
| 435,242 | Great Britain | Sept. 17, 1935 |